(12) United States Patent
Kim et al.

(10) Patent No.: US 10,164,240 B2
(45) Date of Patent: Dec. 25, 2018

(54) COMPOSITE ANODE ACTIVE MATERIAL, ANODE INCLUDING THE COMPOSITE ANODE ACTIVE MATERIAL, AND LITHIUM SECONDARY BATTERY INCLUDING THE ANODE

(71) Applicants: SAMSUNG ELECTRONICS CO., LTD., Gyeonggi-do (KR); SAMSUNG SDI CO., LTD., Gyeonggi-do (KR)

(72) Inventors: Gyusung Kim, Gyeonggi-do (KR); Heechul Jung, Gyeonggi-do (KR); Jinsoo Mun, Gyeonggi-do (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 385 days.

(21) Appl. No.: 14/983,857

(22) Filed: Dec. 30, 2015

(65) Prior Publication Data

US 2016/0190597 A1 Jun. 30, 2016

(30) Foreign Application Priority Data

Dec. 31, 2014 (KR) .................. 10-2014-0195959

(51) Int. Cl.
*H01M 4/134* (2010.01)
*H01M 4/62* (2006.01)
*H01M 4/38* (2006.01)
*H01M 10/052* (2010.01)
*H01M 4/36* (2006.01)
(Continued)

(52) U.S. Cl.
CPC .......... *H01M 4/134* (2013.01); *H01M 4/364* (2013.01); *H01M 4/366* (2013.01); *H01M 4/386* (2013.01); *H01M 4/582* (2013.01); *H01M 4/583* (2013.01); *H01M 4/625* (2013.01); *H01M 4/628* (2013.01); *H01M 10/052* (2013.01); *H01M 2004/027* (2013.01); *H01M 2220/20* (2013.01); *H01M 2220/30* (2013.01); *Y02E 60/122* (2013.01)

(58) Field of Classification Search
CPC ...... H01M 4/134; H01M 4/386; H01M 4/364; H01M 4/366; H01M 4/625; H01M 4/583; H01M 4/582; H01M 4/628; H01M 2004/027; H01M 2220/20; H01M 2220/30; H01M 10/052; Y02E 60/122
See application file for complete search history.

(56) References Cited

U.S. PATENT DOCUMENTS 2,900,490 A * 8/1959 Petryck et al. ...... B23K 35/365
427/59
2010/0129704 A1 5/2010 Luo et al.

FOREIGN PATENT DOCUMENTS

JP 7-214376 * 8/1995
JP 3714259 B2 11/2005
(Continued)

OTHER PUBLICATIONS

Korean Search Report dated Jul. 18, 2013 in Application No. KR 10-2014-0195959 filed on Dec. 31, 2014; 6 pages.

*Primary Examiner* — Laura Weiner
(74) *Attorney, Agent, or Firm* — Cantor Colburn LLP (57) ABSTRACT

A composite anode active material includes a silicon-based material, a metal fluoride, and a carbon-based material. The metal fluoride may be a compound represented by the following formula: MFx, where M is at least one selected from magnesium (Mg), aluminum (Al), titanium (Ti), copper (Cu), zinc (Zn), barium (Ba) and bismuth (Bi), and $0 < x \leq 4$.

19 Claims, 9 Drawing Sheets (51) Int. Cl.
  *H01M 4/583*    (2010.01)
  *H01M 4/58*     (2010.01)
  *H01M 4/02*     (2006.01)

(56) References Cited

FOREIGN PATENT DOCUMENTS

| | | |
|---|---|---|
| JP | 3985849 B2 | 10/2007 |
| KR | 20070006955 A | 1/2007 |
| KR | 2008-0093242 * | 10/2008 |

* cited by examiner

COMPOSITE ANODE ACTIVE MATERIAL, ANODE INCLUDING THE COMPOSITE ANODE ACTIVE MATERIAL, AND LITHIUM SECONDARY BATTERY INCLUDING THE ANODE

CROSS-REFERENCE TO RELATED APPLICATION

This application claims priority to Korean Patent Application No. 10-2014-0195959, filed on Dec. 31, 2014, and all the benefits accruing therefrom under 35 U.S.C. § 119, the content of which in its entirety is herein incorporated by reference.

BACKGROUND

1. Field

The disclosure relates to a composite anode active material, an anode including the composite anode active material, and a lithium secondary battery including the anode.

2. Description of the Related Art

Due to their high energy density and ease of design, lithium secondary batteries have been widely used as a main power source in mobile electronic devices, and application of the lithium secondary batteries have been widen out to electric vehicles or electrical power storages of new regeneration energy. In response to increased market demand, researches on a lithium secondary battery material having high energy density and long lifespan characteristics have been continuously progressed. In a case of an anode material, studies on various materials such as silicon, tin, or germanium as well as carbon have been conducted.

SUMMARY

Among various anode materials, a silicon-based material has an energy density per weight that is about 10 times higher than that of a graphite material and an energy density per volume that is about 2 to 3 times greater than that of a graphite material, where the graphite material is currently used as a common material in a lithium secondary battery, and thus has drawn attention. However, when a silicon-based anode material is used, an electrode may have rapid volume expansion during a charging/discharging process. Accordingly, an electrode material may be pulverized by the volume expansion, which results in deterioration of battery performance, and stability of the lithium secondary battery may deteriorate as well according to the volume change of the electrode itself.

Exemplary embodiments of the invention relate to a novel composite anode active material and an anode including the composite anode active material.

Exemplary embodiments of the invention relate to a lithium secondary battery with improved performance by including the anode.

According to an exemplary embodiment, a composite anode active material includes a silicon-based material; a metal fluoride; and a carbon-based material.

In an exemplary embodiment, the metal fluoride may be a compound represented by the following formula: $MF_x$, where M is at least one selected from magnesium (Mg), aluminum (Al), titanium (Ti), copper (Cu), zinc (Zn), barium (Ba) and bismuth (Bi), and $0<x\leq4$.

In an exemplary embodiment, the metal fluoride may be at least one selected from aluminum fluoride ($AlF_3$), magnesium fluoride ($MgF_2$), and copper fluoride ($CuF_2$).

In an exemplary embodiment, the carbon-based material may be at least one selected from carbon nanotubes, graphite, graphene, carbon black, and a polymer carbonized product.

In an exemplary embodiment, an amount of the metal fluoride may be in a range of about 1 part to about 70 parts by weight based on 100 parts by weight of the composite anode active material.

In an exemplary embodiment, an amount of the carbon-based material may be in a range of about 1 part to about 50 parts by weight based on 100 parts by weight of the composite anode active material.

In an exemplary embodiment, the composite anode active material may have a structure including: a core including the silicon-based material; and a coating layer on at least a part of the core, where the coating layer includes the metal fluoride and the carbon-based material.

In an exemplary embodiment, the coating layer may have a single-layer or multi-layer structure.

In an exemplary embodiment, the composite anode active material may have a structure including: a core including the silicon-based material; and a coating layer on at least a part of the core, where the coating layer includes: a first coating layer on the core; and a second coating layer on the first coating layer. In such an embodiment, the first coating layer may include one of the metal fluoride and the carbon-based material, and the second coating layer may include the other of the metal fluoride and the carbon-based material.

According to another exemplary embodiment, an anode includes the composite anode active material.

According to another exemplary embodiment, a lithium secondary battery includes the anode.

BRIEF DESCRIPTION OF THE DRAWINGS

These and/or other features of the invention will become apparent and more readily appreciated from the following description of the exemplary embodiments, taken in conjunction with the accompanying drawings, in which.

DETAILED DESCRIPTION

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects. "Or" means "and/or." As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of a composite anode active material, an anode including the composite anode active material, and a lithium secondary battery including the anode will be described in detail with reference to the accompanying drawings.

According to an exemplary embodiment, a composite anode active material includes a silicon-based material, a metal fluoride, and a carbon-based material.

As used herein, the term "composite anode active material" refers to an anode active material in which two or more materials having different physical and chemical properties bind to each other, and characteristics of the anode active material are different from those of each of the two or more materials of the anode active material. Also, the two or more materials of the anode active material may be distinctive from each other in the final structure in macroscopic or microscopic view.

In such an embodiment, the metal fluoride may be a compound represented by Formula 1:

$$MFx. \qquad \text{[Formula 1]}$$

In Formula 1, M is at least one selected from magnesium (Mg), aluminum (Al), titanium (Ti), copper (Cu), zinc (Zn), barium (Ba) and bismuth (Bi), and $0<x\leq4$.

In Formula 1, x may be, for example, 2 or 3.

In such an embodiment, the metal fluoride may be, for example, at least one selected from aluminum fluoride ($AlF_3$), magnesium fluoride ($MgF_2$), and copper fluoride ($CuF_2$).

In such an embodiment, the carbon-based material may be, for example, at least one selected from carbon nanotubes ("CNT"s), graphite, graphene, carbon black, and a polymer carbonized product.

In an exemplary embodiment, an amount of the metal fluoride may be in a range of about 1 part to about 70 parts by weight, or, for example, about 10 parts to about 60 parts by weight, based on 100 parts by weight of the composite anode active material. When the amount of the metal fluoride is within this range, stability of the composite anode active material may be maintained when a volume of the silicon-based material expands during a charging/discharging process. Thus, when an anode including the composite anode active material is used, a lithium secondary battery with improved lifespan characteristics may be manufactured.

In an exemplary embodiment, an amount of the carbon-based material is in a range of about 1 part to about 50 parts by weight, or, for example, about 5 parts to about 25 parts by weight, based on 100 parts by weight of the composite anode active material.

In the anode including the silicon-based material as an anode active material, lithium ions react with silicon and thus may form an alloy. In the anode, a lewis acid, such as $PF_6$ or HF that is a decomposition product of a lithium salt, such as $LiPF_6$, included in an electrolyte during a charging/discharging process. A silicon-silicon (Si—Si) network structure disconnects in the silicon-based material due to the lewis acid. As a result, an irreversible silicon-fluorine (Si—F) bond may be formed. The silicon-fluorine bond has an intense bonding strength and high stability, which causes irreversible reaction of the anode active material containing the silicon-based material, such that the silicon-based material may not function as an anode active material. As a result, a capacity of the anode may decrease. Also, a solid electrolyte interface ("SEI") layer including an electrolyte decomposition product may be formed on a surface of the anode including the silicon-based material, and thus a charging/discharging reversibility of the anode may be deteriorated. The silicon-based material may form an alloy with lithium during a charging process, and thus a volume of the silicon-based material may increase and powdered, which promotes decomposition of the electrolyte.

Accordingly, an exemplary embodiment of the invention relate to a composite anode active material including a metal fluoride and a carbon-based material in a silicon-based material to stabilize lifespan of a battery including the composite anode active material by suppressing formation of a new SEI layer or destruction of the formed SEI layer caused by volume expansion and contraction of the silicon-based material during a charging/discharging process. When such an embodiment of the composite anode active material is used, an irreversible reaction caused by a silicon-fluorine (Si—F) bond may be suppressed, and stability of the battery with respect to volume expansion of the silicon-based material during a charging/discharging process may be realized.

An exemplary embodiment of the invention relate to a composite anode active material including a metal fluoride and a carbon-based material in addition to a silicon-based material to suppress formation of a new SEI layer or destruction of a formed SEI layer due to volume expansion and contraction of the silicon-based material during a charging/discharging process, so that lifespan of a battery including the composite anode active material may be stable. When such an embodiment of the composite anode active material is used, an irreversible reaction caused by a silicon-fluorine (Si—F) bond may be suppressed, and stability of the battery with respect to volume expansion of the silicon-based material may be secured.

According to another exemplary embodiment, a composite anode active material may have a structure that includes a core including a silicon-based material; and a coating layer on at least a part of the core. In such an embodiment, the coating layer includes a metal fluoride and a carbon-based material. In one exemplary embodiment, for example, the coating layer may have a single-layer structure.

In an alternative exemplary embodiment, the coating layer may have a multi-layer structure. In such an embodiment, where the coating layer has a multi-layer structure, the metal fluoride and the carbon-based material may be included in different layers. In one exemplary embodiment, for example, the composite anode active material may have a structure that includes a first coating layer on the core including the silicon-based material, and a second coating layer on the first coating layer. In such an embodiment, the first coating layer may include the metal fluoride and the second coating layer may include the carbon-based material. When the composite anode active material has the multi-layer structure including first and second coating layers, a lithium secondary battery including the composite anode active material may have improved lifespan characteristics. In an alternative exemplary embodiment, the first coating layer may include the carbon-based material, and the second coating layer may include the metal fluoride. The coating layer may be in the form of a continuous coating layer or a non-continues coating layer such as islands. In an exemplary embodiment, the thickness of the coating layer may be in a range of about 1 nanometer (nm) to about 200 nm, or, for example, about 30 nm to about 200 nm, but a thickness of the coating layer is not particularly limited within a scope for increasing a capacity and efficiency of a battery. When the thickness of the coating layer is within this range, a lithium secondary battery including the anode active material may have high charging/discharging characteristics and lifespan characteristics.

In such an embodiment, the carbon-based material may include at least one selected from CNTs, graphite, graphene, carbon black, and a polymer carbonized product.

In one exemplary embodiment, for example, the CNTs may include a single-wall CNT, a multi-wall CNT, or a combination thereof. In some embodiments, an average aspect ratio of the CNTs may be about 300 or lower. In one exemplary embodiment, for example, the average aspect ratio of the CNTs may be about 250 or lower, or in a range of about 50 to about 200.

As used herein, the term "average aspect ratio" is defined as "a ratio of an average length to average diameter (average length/average diameter). The term "average diameter" refers to an average value taken from values obtained by measuring diameters of the thickest parts of ten or more CNTs by using a scanning electron microscope ("SEM"), and the term "average length" refers to an average value taken from values obtained by measuring lengths of ten or more CNTs by using an SEM.

An average diameter of the CNTs may be in a range of about 1 nm to about 50 nm. The CNTs having the average diameter within this range are evenly distributed throughout the composite anode active material, which results in improvement of electrical conductivity, and thus charging/discharging characteristics of the composite anode active material may improve.

The CNTs may undergo activation treatment. Here, the term "activation treatment" may refer to, for example, a process of treating commercially available CNTs with at least one selected from acids such as nitric acid or sulfuric acid and oxidizing agents such as potassium permanganate and then performing ultrasonic treatment thereon. When the CNTs undergo such process, conductivity of the CNTs may further improve.

In such an embodiment, the silicon-based material includes silicon or a silicon alloy. The silicon alloy may include at least one element selected from boron (B), magnesium (Mg), aluminum (Al), phosphorus (P), calcium (Ca), titanium (Ti), vanadium (V), chrome (Cr), manganese (Mn), iron (Fe), cobalt (Co), nickel (Ni), copper (Cu), zinc (Zn), germanium (Ge), zirconium (Zr), niobium (Nb), molybdenum (Mo), palladium (Pd), silver (Ag), tin (Sn), antimony (Sb), tantalum (Ta), selenium (Se), tellurium (Te), indium (In), gallium (Ga), bismuth (Bi), tungsten (W), barium (Ba), sulfur (S), carbon (C), and nitrogen (N), in addition to silicon. Here, an amount of the at least one element in silicon alloy may be in a range of about 0.1 atomic percent (at %) to about 50 at %.

In one exemplary embodiment, for example, the silicon alloy may include $SiB_4$, $SiB_6$, $Mg_2Si$, $Ni_2Si$, $NiSi_2$, $TiSi_2$, $MoSi_2$, $CoSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $SiW$, $Si_4W$, $Si_{0.95}W_{0.05}$, $Si_4Cu$, $Si_{0.95}Mo_{0.05}$, $Si_{0.99}B_{0.01}$, $Si_{0.995}P_{0.005}$, or $Si_{0.9}Zn_{0.1}$.

Figure 1:
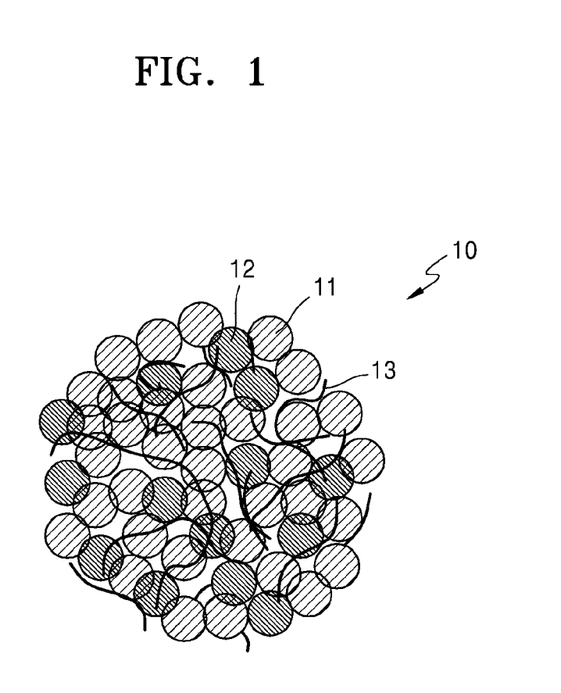
FIG. 1 is a schematic view of a structure of a composite anode active material according to an exemplary embodiment.

FIG. 1 is a schematic view of a structure of a composite anode active material 10 according to an embodiment.

Referring to FIG. 1, an embodiment of the composite anode active material 10 includes a silicon-based material 11, a metal fluoride 12, and a carbon-based material 13. Stability of the composite anode active material 10 having such a structure may be effectively maintained with respect to volume expansion of the silicon-based material 11 during a charging/discharging process.

Figure 2A:
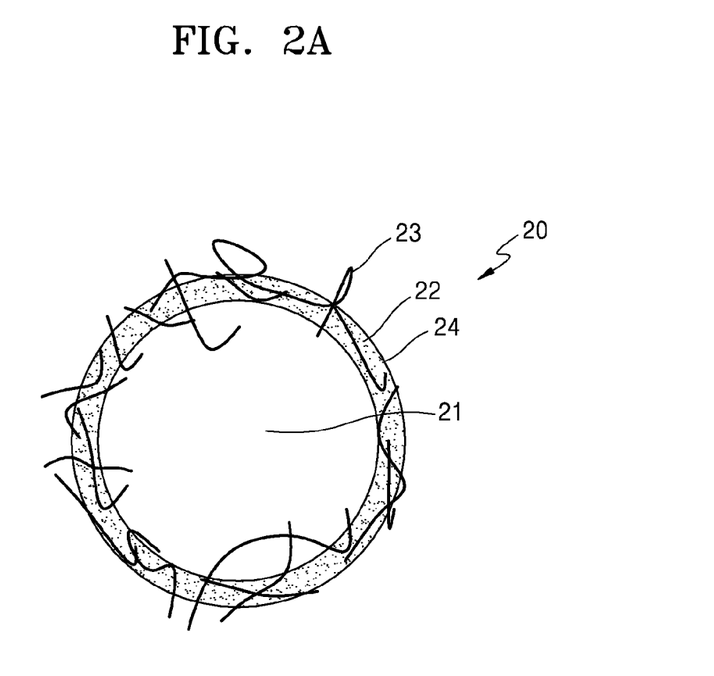
FIGS. 2A and 2B illustrate structures of a composite anode active material according to another exemplary embodiment.

FIG. 2A is a schematic view of a structure of a composite anode active material according to an alternative embodiment.

Referring to FIG. 2A, an alternative exemplary embodiment of the composite anode active material 20 includes a core including a silicon-based material 21; and a coating layer 24 on or surrounding at least a part of the core, in which the coating layer 24 includes a metal fluoride 22 and a carbon-based material 23.

As shown in FIG. 2A, in an exemplary embodiment, where the carbon-based material 23, such as CNTs, is in the coating layer 24, the carbon-based material 23 may be embedded in the coating layer 24 or may extend from or be partially exposed through the layer including the metal fluoride 22.

In the coating layer 24, a part of the carbon-based material 23 may be melted and thus amorphized.

Figure 2B:
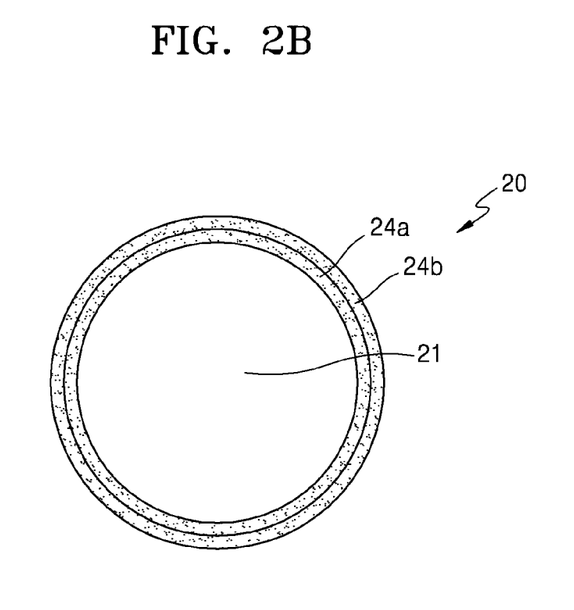

FIG. 2B is a schematic view of a structure of a composite anode active material according to another alternative embodiment. An embodiment of the composite anode active material, as shown in FIG. 2B, includes a core including a silicon-based material 21; a first coating layer 24a on at least a part of the core; and a second coating layer 24b on the first coating layer 24a.

In such an embodiment, the first coating layer 24a may include a metal fluoride, and the second coating layer 24b may include a carbon-based material, or vice versa.

In such an embodiment, a thickness of each of the first coating layer 24a and the second coating layer 24b may be in a range of about 0.5 nm to about 100 nm. In such an embodiment, the total thickness of the first coating layer 24a and the second coating layer 24b may be in a range of about 1 nm to about 200 nm.

The composite anode active material having the structure shown in FIG. 2A or FIG. 2B includes a coating layer including or formed of a conductive material such that a conducting pathway may be formed on a silicon-based material, which results in improving electrochemical characteristics as an anode active material. In such an embodiment shown in FIG. 2A or FIG. 2B, the coating layer of the composite anode active material blocks direct contact between the silicon-based material and an electrolyte, which suppresses electrolyte decomposition occurring at a surface of the silicon-based material, and thus pulverization of silicon particles caused by the volume change of the silicon-based material may be prevented. As a result, when an anode including such an embodiment of the composite anode active material is used, a lithium secondary battery having improved lifespan characteristics may be obtained.

An exemplary embodiment of the lithium secondary battery including an embodiment of the composite anode active material described herein has improved lifespan characteristics, and the battery may be used for a long period of time when it is applied to an electric vehicle. Such an embodiment of the battery has improved rate characteristics. In such an embodiment, a coating layer with improved characteristics is on a surface of the anode, which suppresses a side reaction with an electrolyte and improves electrical conductivity of the surface, such that an internal resistance of the battery may be decreased.

In an alternative exemplary embodiment, the composite anode active material may be a composite including silicon, CNTs, and at least one selected from copper fluoride, magnesium fluoride, and aluminum fluoride.

In such an embodiment of the composite anode active material, an amount of the copper fluoride, the magnesium fluoride and the aluminum fluoride is in a range of about 10 parts to about 50 parts by weight based on 100 parts by weight of the composite anode active material.

Hereinafter, an exemplary embodiment of a method of preparing a composite anode active material will be described.

In an exemplary embodiment, a silicon-based material, a metal fluoride, and a carbon-based material are mechanically milled. As used herein, mechanical milling refers to a dry method of applying mechanical energy to the silicon-based material, metal fluoride and carbon-based material without using a solvent.

The mechanical milling may be performed using a ball mill or a spex mill.

The milling may be performed, for example, at a rate of about 300 rounds per minute (rpm) to about 500 rpm for about 30 minutes to about 10 hours. In the milling process, the silicon-based material, the metal fluoride and the carbon-based material may form a composite.

The milling process may be, for example, performed in two steps. First, the silicon-based material and the carbon-based material are mixed, and primary mechanical milling may be performed thereon. Then, the metal fluoride is added to the resultant, and secondary mechanical milling may be performed thereon. When the milling process is performed in the two steps, a lithium secondary battery thus prepared may have improved lifespan characteristics.

According to another an embodiment, an anode includes such an embodiment of the composite anode active material described above.

In an exemplary embodiment, the anode may further include other anode active materials that are generally used in a lithium secondary battery, in addition to the composite anode active material.

In one exemplary embodiment, for example, the other anode active materials may include a carbon-based material, a lithium metal, a lithium metal alloy, or a silicon oxide-based material.

The anode may further include a binder and/or a conducting agent in addition to the composite anode active material and other anode active materials.

The binder promotes binding of components such as the composite anode active material, other anode active materials, and conducting agent, and binding of the anode to a current collector. In one exemplary embodiment, for example, the binder may include polyamideimide, polyacrylic acid ("PAA"), polyvinylidene fluoride, polyvinyl alcohol, carboxymethylcellulose ("CMC"), starch, hydroxypropyl cellulose, regenerated cellulose, polyvinylpyrrolidone, tetrafluoroethylene, polyethylene, polypropylene, polystyrene, lithium polyacrylate, lithium polymethacrylate, ethylene-propylene-diene monomer ("EPDM"), sulfonated EPDM, styrene butadiene rubber, fluoride rubber, and various polymers, but embodiments are not limited thereto.

In an exemplary embodiment, the binder may include lithium ions. In one exemplary embodiment, for examples, lithium polyacrylate ("LiPAA") is used as the binder An amount of the binder may be in a range of about 1 part to about 10 parts by weight based on 100 parts by weight of the total weight of the composite anode active material and other anode active materials. When the amount of the binder is within this range, a binding force of the anode to a current collector may increase.

The conducting agent may be any material that does not cause chemical change to a lithium secondary battery including the conducting agent and has a high conductivity.

In one exemplary embodiment, for example, the conducting agent may include at least one carbon-based material selected from carbon black, carbon fibers, and graphite. In one exemplary embodiment, for example, the carbon black may be selected from acetylene black, Ketjen black, super P, channel black, furnace black, lamp black, and thermal black. The graphite may be natural graphite or artificial graphite.

The anode may further include other conducting agent in addition to the carbon-based conducting agent. The other conducting agent may include at least one selected from conductive fibers such as metal fibers; metal powder such as aluminum powder or nickel powder; conductive whiskers such as a zinc oxide or a potassium titanate; and a conductive polymer such as a polyphenylene derivative.

The composite anode active material may serve as a conducting agent due to the carbon-based anode active material in addition to serving as an active material, and thus an amount of the conducting agent may be small compared to an amount of the conducting agent when a general anode active material is used. An amount of the conducting agent may be in a range of about 0.01 part to about 10 parts by weight, or, for example, about 0.5 part to about 5 parts by weight, based on 100 parts by weight of the total weight of the composite anode active material and other anode active materials. When the amount of the conducting agent is within this range, the anode thus obtained has improved ion conductivity characteristics.

Hereinafter, an exemplary embodiment of a method of preparing the anode will be described.

First, the composite anode active material layer according to an embodiment, a binder, a solvent, and a conducting agent are mixed to prepare a composition for an anode active material layer.

Then, the composition for an anode active material is coated and dried on an anode current collector to prepare an anode.

A thickness of the anode current collector may be in a range of about 3 micrometers ($\mu$m) to about 500 $\mu$m. The anode current collector is not particularly limited as long as it does not generate any chemical change in the battery and has a high conductivity. In one exemplary embodiment, for example, the anode current collector may include copper, stainless steel, aluminum, nickel, titanium, calcined carbon, copper or stainless steel that is surface-treated with carbon, nickel, titanium, or silver, and an aluminum-cadmium alloy. In such an embodiment, the anode current collector, as well as a cathode current collector, may have an uneven micro structure at a surface thereof to enhance a binding force of the composite anode active material. In such an embodiment, the anode current collector may be used in various forms including a film, a sheet, a foil, a net, a porous body, a foaming body, or a non-woven body.

In one exemplary embodiment, for example, the solvent may include N-methylpyrrolidone ("NMP"), acetone, water, or a mixture thereof. An amount of the solvent may be in a range of about 50 part to about 3000 parts by weight based on 100 parts by weight of the total weight of the composite anode active material and other anode active materials. When the amount of the solvent is within this range, an active material layer may be easily formed.

According to another exemplary embodiment, a lithium secondary battery includes such an embodiment anode described above.

Figure 3:
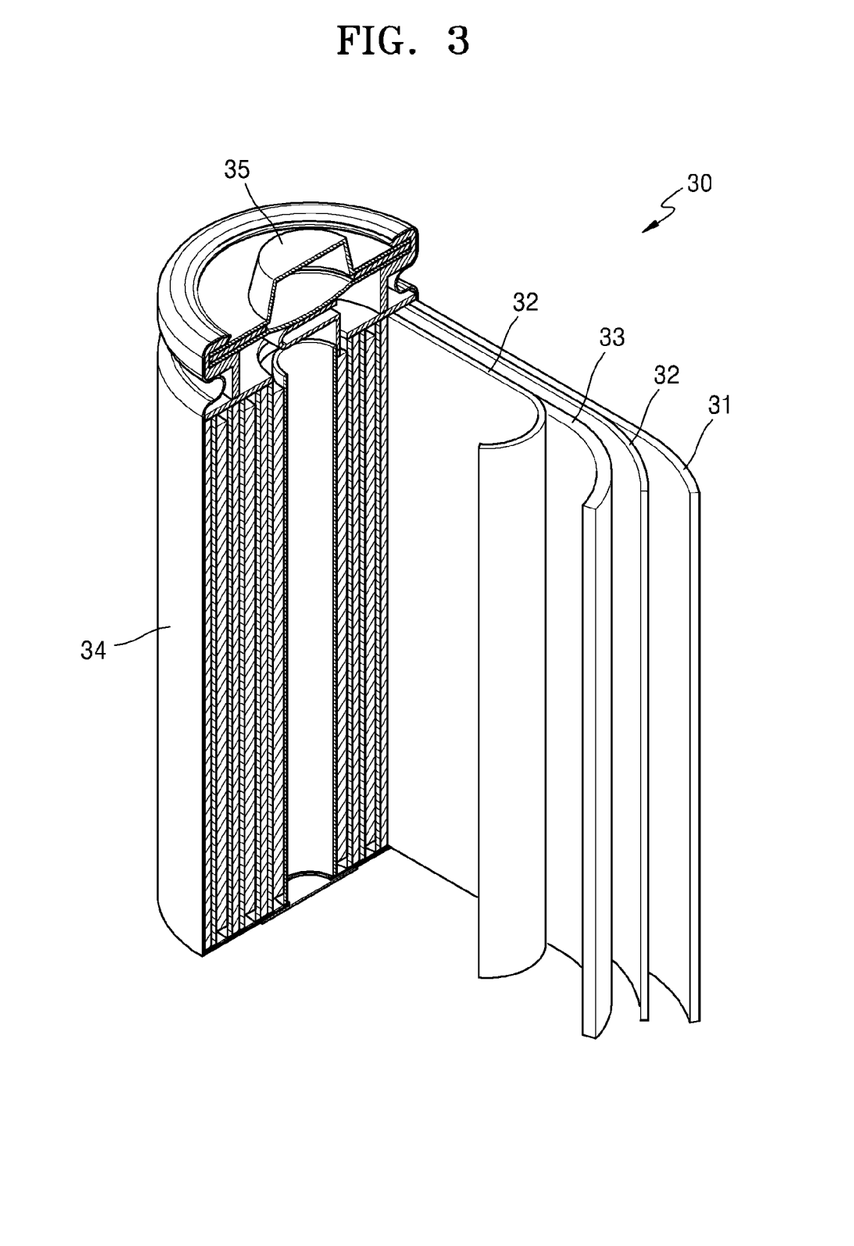
FIG. 3 is a schematic view of a lithium secondary battery according to an embodiment.

FIG. 3 is a schematic view of a lithium secondary battery 30 according to another exemplary embodiment.

Referring to FIG. 3, the lithium secondary battery 30 includes a cathode 33, an anode 31, and a separator 32.

In an exemplary embodiment of a method of manufacturing a lithium secondary battery 30, the cathode 33, the anode 31 and the separator 32 are wound or folded, and then accommodated in a battery case 34. Subsequently, an electrolyte (not shown) is injected into the battery case 34, and the battery case 34 is sealed by a cap assembly 35, thereby completing the manufacture of the lithium secondary battery 30. In such an embodiment, the battery case 34 may have a cylindrical shape, a rectangular shape, or a thin-film shape. The lithium secondary battery 30 may be a thin-film battery.

In such an embodiment, the lithium secondary battery has high capacity characteristics as well as increased lifespan characteristics. As used herein, the term "discharge" refers to a process of deintercalating lithium ions from an anode, and the term "charge" refers to a process of intercalating lithium ions to an anode.

Hereinafter, an exemplary embodiment of a method of preparing a lithium secondary battery will be described in detail.

First, an anode is prepared in the same manner as that described above.

Next, a cathode is prepared in the similar manner as preparing the anode described above. In one exemplary embodiment, for example, a composition for a cathode active material layer is prepared by mixing a lithium transition metal oxide, a binder, a conducting agent and a solvent. Then, the composition for a cathode active material layer is coated and dried on a cathode current collector to prepare a cathode.

Types and amounts of the binder, the conducting agent and the solvent used in the preparation of the composition for a cathode active material layer may be the same as those used in the preparation of the composition for an anode active material layer.

The lithium transition metal oxide may be at least one selected from $LiCoO_2$, $LiNiO_2$, $LiMnO_2$, $LiMn_2O_4$, $Li(Ni_aCo_bMn_c)O_2$ (where, 0<a<1, 0<b<1, 0<c<1, and a+b+c=1), $LiNi_{1-Y}Co_YO_2$ (where, 0≤Y<1), $LiCo_{1-Y}Mn_YO_2$ (where, 0≤Y<1), $LiNi_{1-Y}Mn_YO_2$ (where, 0≤Y<1), $LiMn_{2-Z}Ni_ZO_4$ (where, 0<Z<2), $LiMn_{2-Z}Co_ZO_4$ (where, 0<Z<2), $LiCoPO_4$, and $LiFePO_4$.

A thickness of the cathode current collector may be in a range of about 3 $\mu$m to about 500 $\mu$m. The cathode current collector is not particularly limited as long as the cathode current collector does not generate any chemical change in the battery and has a high conductivity. In one exemplary embodiment, for example, the cathode current collector may include stainless steel, aluminum, nickel, titanium, calcined carbon, aluminum or stainless steel that is surface-treated with carbon, nickel, titanium, or silver. In such an embodiment, the cathode current collector may have an uneven micro structure at a surface thereof to enhance a binding force of the cathode active material. IN such an embodiment, the cathode current collector may be used in various forms including a film, a sheet, a foil, a net, a porous body, a foaming body, or a non-woven body.

Then, a separator is disposed between the cathode and the anode, and an organic liquid electrolyte is injected thereto, thereby completing manufacture of the lithium secondary battery.

The lithium secondary battery may be prepared by, for example, sequentially stacking the anode, the separator, and the cathode, winding or folding the stack, accommodating the stack into a cylindrical or rectangular battery case or pouch, and injecting an organic liquid electrolyte into the battery case or pouch.

A pore diameter of the separator may be in a range of about 0.01 μm to about 10 μm, and a thickness may be generally in a range of about 5 μm to about 300 μm. In some embodiments, the separator may be an olefin-based polymer such as polypropylene or polyethylene; or a sheet or a non-woven fabric formed of glass fibers.

The organic liquid electrolyte may be prepared by dissolving a lithium salt in an organic solvent.

In one exemplary embodiment, for example, the organic solvent may be at least one selected from propylenecarbonate, ethylenecarbonate, fluoroethylencarbonate, butylenecarbonate, dimethylcarbonate, diethylcarbonate, methylethylcarbonate, methylpropylcarbonate, ethylpropylcarbonate, methylisopropylcarbonate, dipropylcarbonate, dibutylcarbonate, benzonitrile, acetonitrile, tetrahydrofuran, 2-methyltetrahyerofuran, γ-butylolactone, dioxolane, 4-methyldioxolane, N,N-dimehtylformamide, dimethylacetamide, dimethylsulfoxide, dioxane, 1,2-dimethyoxyethane, sulfolane, dichloroethane, chlorobenzene, nitrobenzene, diethyleneglycol, dimethylether, and a combination thereof.

In one exemplary embodiment, for example, the lithium salt may be at least one selected from $LiPF_6$, $LiBF_4$, $LiSbF_6$, $LiAsF_6$, $LiClO_4$, $LiCF_3SO_3$, $Li(CF_3SO_2)_2N$, $Li(F_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where, x and y are a natural number), LiCl, LiI, and a combination thereof.

In an alternative exemplary embodiment of the lithium secondary battery, an organic solid electrolyte and/or an inorganic solid electrolyte may be used in addition to the organic liquid electrolyte. When the organic solid electrolyte and/or inorganic solid electrolyte is used, the solid electrolyte may serve as a separator at the same time, and thus a separator may be omitted.

In one exemplary embodiment, for example, the organic solid electrolyte may be polyethylene derivatives, polyethylene oxide derivatives, polypropylene oxide derivatives, phosphoric acid ester polymers, polyester sulfide, polyvinyl alcohols, or polyvinylidene fluoride.

In one exemplary embodiment, for example, the inorganic solid electrolyte may be $Li_3N$, LiI, $Li_5NI_2$, $Li_3N$—LiI—LiOH, $Li_2SiS_3$, $Li_4SiO_4$, $Li_4SiO_4$—LiI—LiOH, or $Li_3PO_4$—$Li_2S$—$SiS_2$.

One or more embodiments will now be described in more detail with reference to the following examples. However, such examples are not intended to limit the scope of the one or more embodiments.

Example 1: Preparation of Composite Anode Active Material

A silicon powder (available from Aldrich) having an average particle diameter of about 4 μm and single-wall CNTs (purity: 90% or higher, average diameter: 2 nm, and average length: 30 μm, available from Nanotec) were mixed in a mortar, and the mixture was milled in an argon gas atmosphere in a glove box using a mill, SPEX 8000M, at a rate of about 300 rpm for about 1 hour. Then, aluminum fluoride was added to the resultant, and milling was performed thereon using a mortar for about 10 minutes to prepare a composite anode active material including CNTs and aluminum fluoride.

A weight ratio of the silicon powder, single-wall CNTs and aluminum fluoride was about 35:15:50.

Example 2: Preparation of Composite Anode Active Material

A composite anode active material was prepared in the same manner as used in Example 1, except that magnesium fluoride was used instead of aluminum fluoride.

Example 3: Preparation of Composite Anode Active Material

A composite anode active material was prepared in the same manner as used in Example 1, except that copper fluoride was used instead of aluminum fluoride.

Example 4: Preparation of Composite Anode Active Material

A composite anode active material was prepared in the same manner as used in Example 3, except that a weight ratio of a silicon powder, CNTs and copper fluoride was about 35:5:60.

Comparative Example 1: Preparation of Anode Active Material

A silicon powder having an average particle diameter of about 4 μm and single-wall CNTs (purity: 90% or higher, average diameter: 2 nm, average length 30 μm, available from Nanotec) were mixed at a weight ratio of 35:15 in a mortar, and the mixture was milled in an argon gas atmosphere in a glove box using a mill, SPEX 8000M, at a rate of about 300 rpm for about 1 hour to prepare an anode active material.

Comparative Example 2: Preparation of Anode Active Material

Alumina ($Al_2O_3$) was added to the anode active material prepared by Comparative Example 1, mixed in a mortar, and milled for about 30 minutes to obtain an anode active material. A mixing weight ratio of the silicon powder, single-wall CNTs and alumina was about 35:15:50.

Comparative Examples 3 and 4: Preparation of Anode Active Materials

An anode active material was prepared in the same manner as used in Comparative Example 2, except that nickel oxide (NiO) and magnesium oxide (MgO) were used instead of alumina ($Al_2O_3$), respectively.

Comparative Example 5: Preparation of Anode Active Material

A silicon powder having an average particle diameter of about 4 μm, single-wall CNTs (purity: 90% or higher, average diameter: 2 nm, average length 30 μm, available from Nanotec), aluminum fluoride were simple-blended to obtain an anode active material including a mixture of silicon, CNTs, and aluminum fluoride ($AlF_3$). A mixing weight ratio of the silicon powder, single-wall CNTs, and aluminum fluoride was about 35:15:50.

Comparative Example 6: Preparation of Anode Active Material 35 parts by weight of a silicon powder and 65 parts by weight of aluminum fluoride were milled using a mill, SPEX 8000M for about 30 minutes to prepare an anode active material.

Comparative Example 7: Preparation of Anode Active Material

A solution prepared by dissolving ammonium fluoride (available from Aldrich) in water was added to the anode active material prepared in Comparative Example 1, stirred for 3 hours and dried, and heat-treated at a temperature of 600° 0 in a $N_2$ atmosphere for 12 hours to prepare a fluoride-treated anode active material. Here, ammonium fluoride was added so that a mixing weight ratio of the silicon powder:single-wall CNTs:ammonium fluoride was about 35:15:1.

Comparative Example 8: Preparation of Anode Active Material

An anode active material was prepared in the same manner as used in Comparative Example 7, except that a mixing weight ratio of the silicon powder:single-wall CNTs: ammonium fluoride was about 35:15:5.

Manufacturing Example 1: Preparation of Coin-Half Cell

The composite anode active material prepared in Example 1 and an N-methyl-2-pyrrolidone ("NMP") solution of polyamide-imide ("PAI"), as a binder, were mixed so that a weight ratio of composite anode active material:PAI was about 9:1 in a mortar to prepare a slurry. The slurry was bar-coated on a copper foil (having a thickness of 15 μm) using a doctor blade. The resultant was primarily dried at a temperature of 80° C., pressed, secondarily dried at high temperature and reduced pressure (in vacuum at 200° C. for 2 hours), and punched to prepare an anode.

Then, the anode and a lithium metal as a counter electrode were used to prepare a 2032-type coin-half cell. Here, an organic electrolyte was a solution prepared by dissolving 1.3 M $LiPF_6$ in a solvent mixture including ethylene carbonate ("EC"), diethyl carbonate ("DEC"), and fluoroethylene carbonate ("FEC") at a volume ratio of about 2:6:2. Also, a polyethylene separator (available from Tonen) was used as a separator.

Manufacturing Examples 2 to 4: Preparation of Coin-Half Cells

Coin-half cells were prepared in the same manner as used in Manufacturing Example 1, except that the composite anode active materials prepared in Examples 2 to 4 were used instead of the composite anode active material prepared in Example 1, respectively.

Comparative Manufacturing Examples 1 to 8: Preparation of Coin-Half Cells

Coin-half cells were prepared in the same manner as used in Manufacturing Example 1, except that the anode active materials prepared in Comparative Examples 1 to 8 were used instead of the composite anode active material prepared in Example 1.

Evaluation Example 1: X-Ray Diffraction Analysis

1) Examples 1 to 3 and Comparative Examples 1 to 4

X-ray diffraction analysis was performed on the composite anode active materials prepared in Examples 1 to 3 and the anode active materials prepared in Comparative Examples 1 to 4. The results of the X-ray diffraction analysis were analyzed using an X-ray diffraction analyzer (a diffractometer, Rigaku RINT2200HF+, using Cu-Kα radiation (1.540598 Å)).

Figure 4A:
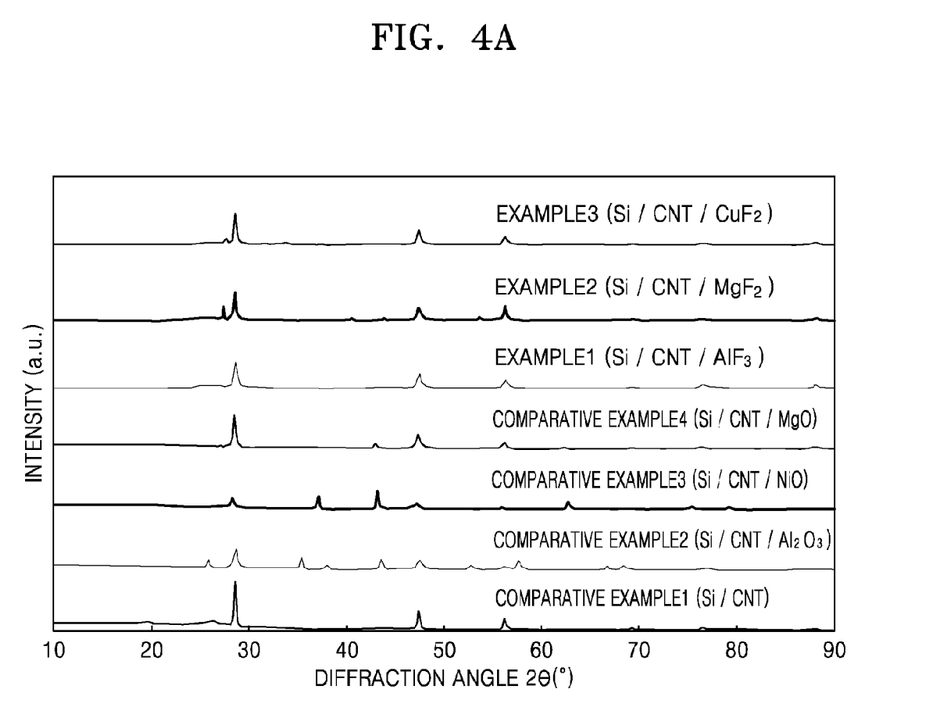
FIG. 4A is an X-ray diffraction analysis spectrum of composite anode active materials prepared in Examples 1 to 3 and anode active materials prepared in Comparative Examples 1 to 4.

Referring to FIG. 4A, the anode active materials prepared in Comparative Examples 2 to 4 had X-ray powder diffraction ("XRD") peaks of magnesium oxide, nickel oxide and aluminum oxide observed at a detector angle 2θ in a range of about 35° to about 47°.

However, the composite anode active materials prepared in Examples 1 to 3 had XRD peaks different from those of the anode active materials prepared in Comparative Examples 1 to 4.

2) Example 1 and Comparative Example 2

Figure 4B:
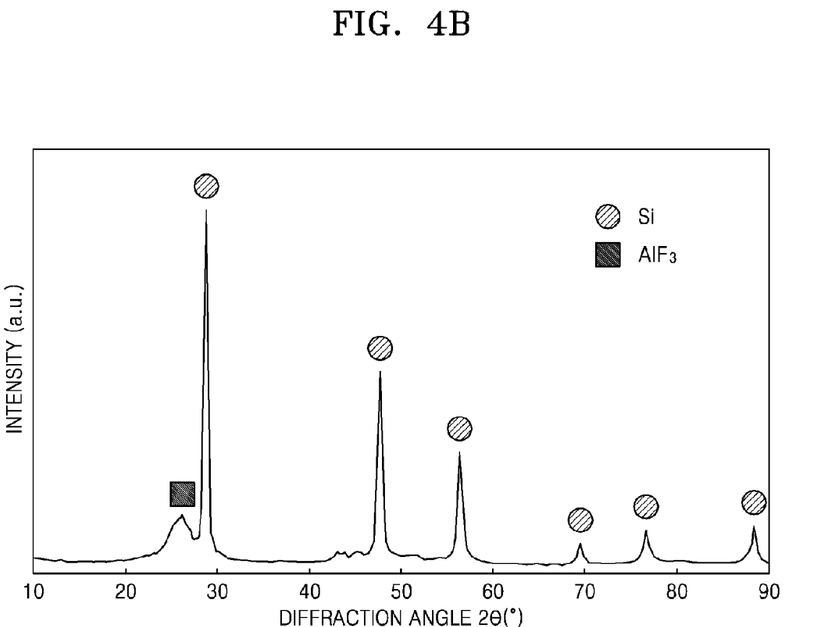
FIG. 4B is an X-ray diffraction analysis spectrum of the composite anode active material prepared in Example 1.
Figure 4C:
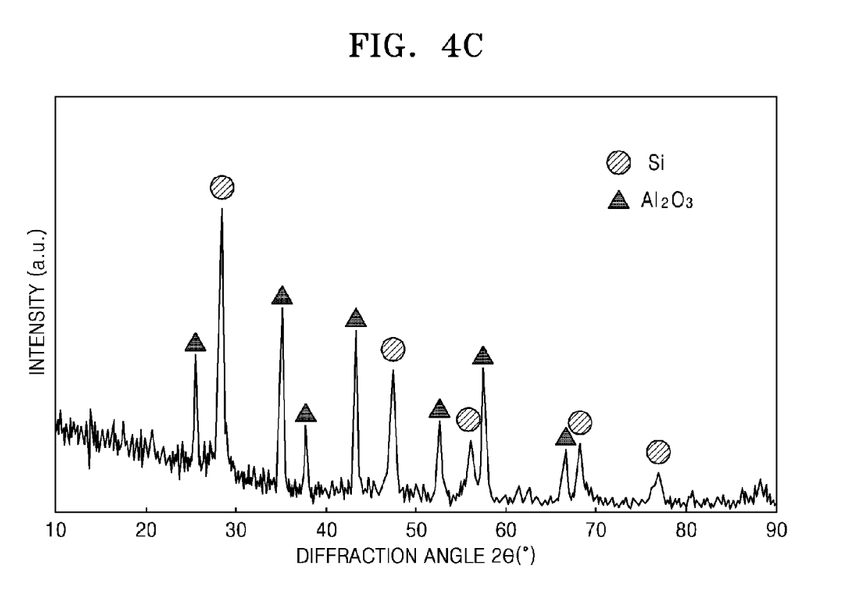
FIG. 4C is an X-ray diffraction analysis spectrum of the anode active material prepared in Comparative Example 2.

X-ray diffraction analysis was performed on the composite anode active material prepared in Example 1 and the anode active material prepared in Comparative Example 2, and the results are shown in FIGS. 4B and 4C, respectively. The results of the X-ray diffraction analysis were analyzed by using an X-ray diffraction analyzer (a diffractometer, Rigaku RINT2200HF+, using Cu-Kα radiation (1.540598 Å)).

Referring to FIG. 4C, the anode active materials prepared in Comparative Example 2 had a silicon peak and an alumina peak in the XRD pattern. However, as shown in FIG. 4B, the anode active material prepared in Example 1 had a silicon peak and an aluminum fluoride ($AlF_3$) peak.

Evaluation Example 2: Charging/Discharging Characteristics

Charging/discharging characteristics of the coin-half cells prepared in Manufacturing Example 1 and Comparative Manufacturing Example 2 were evaluated by using a charging/discharging device (model: TOYO-3100 available from TOYO). In the first cycle (n=1), each of the coin-half cells was charged at room temperature (about 25° C.) at a C-rate of 0.2 C (unit: milliampere per gram (mA/g)) until a voltage was 0.01 volt (V), and was discharged at a rate of 0.2 C until a voltage was 1.5 V. Then, the cell rested for 10 minutes. Subsequently, in the second cycle and cycles thereafter (n≥2), the cell was charged at room temperature (25° C.) at a rate of 0.5 C until a voltage was 0.01 V, and was discharged at a rate of 0.5 C until a voltage was 1.5 V. The cell underwent 20 cycles of the charging/discharging process (i.e., n=20).

Figure 5:
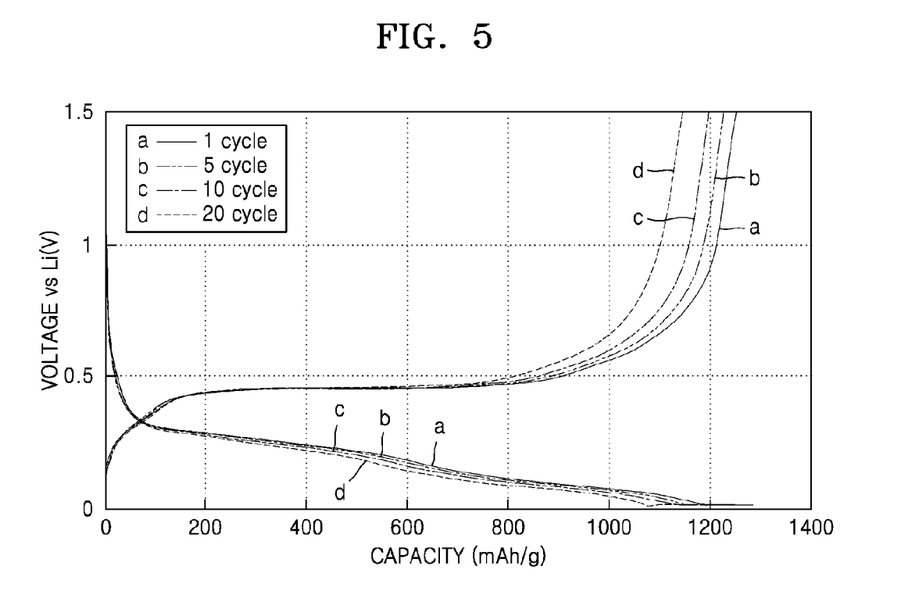
FIG. 5 is a graph showing a voltage change according to the number of cycles in a coin-half cell prepared in Manufacturing Example 1.
Figure 6:
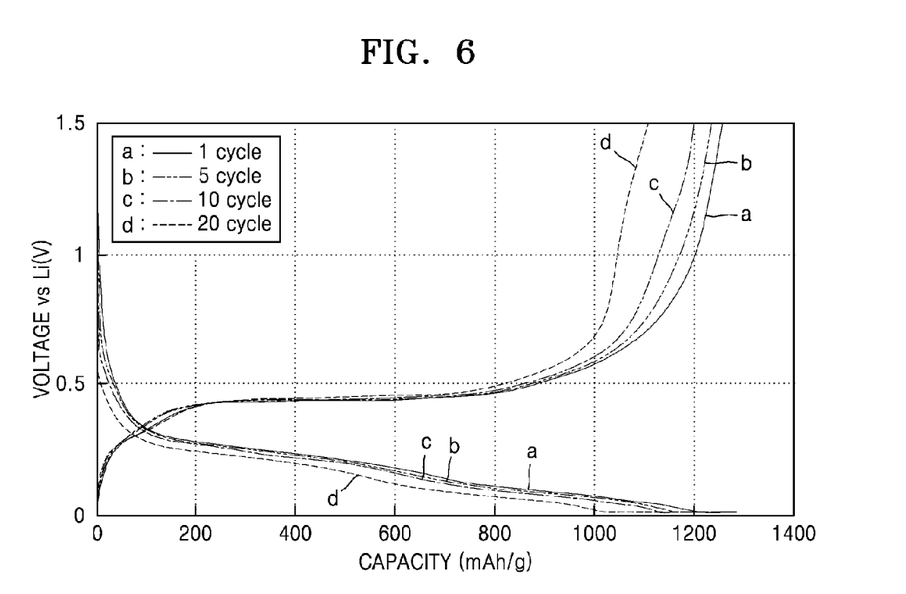
FIG. 6 is a graph showing a voltage change according to the number of cycles in a coin-half cell prepared in Comparative Manufacturing Example 2.

A voltage change according to the number of cycles of charging/discharging the coin-half cells prepared in Manufacturing Example 1 and Comparative Manufacturing Example 2 are shown in FIGS. 5 and 6, respectively.

As shown in FIG. 5, the coin-half cell prepared in Manufacturing Example 1 has stable charging/discharging characteristics without a significant capacity decrease even when the number of charging/discharging cycle increases, and a voltage change according to electrochemical reaction in the coin-half cell appeared to be small.

However, as shown in FIG. 6, the coin-half cell prepared in Comparative Manufacturing Example 2 had a capacity decrease as the number of charging/discharging cycle increases, and a voltage change in the coin-half cell according to an electrochemical reaction appeared to be significant.

Evaluation Example 3: Initial Efficiency and Capacity Retention Ratio

Charging/discharging characteristics of the coin-half cells prepared in Manufacturing Examples 1 to 4 and Comparative Manufacturing Examples 1 to 8 were evaluated by using a charging/discharging device (model: TOYO-3100 available from TOYO). In the first cycle (n=1), each of the coin-half cells was charged at room temperature (25° C.) at a C-rate of 0.2 C (unit: mA/g) until a voltage was 0.01 V, and was discharged at a rate of 0.2 C until a voltage was 1.5 V. Then, the cell rested for 10 minutes. Subsequently, in the second cycle and cycles thereafter (n≥2), the cell was charged at room temperature (25° C.) at a rate of 0.5 C until a voltage was 0.01 V, and was discharged at a rate of 0.5 C until a voltage was 1.5 V. The cell underwent 50 cycles of the charging/discharging process (i.e., n=50).

Initial efficiency and capacity retention ratios of the coin-half cells prepared in Manufacturing Examples 1 to 4 and Comparative Manufacturing Examples 1 to 8 were calculated as defined in Equations 1 and 2, and the results are shown in Table 1.

Initial efficiency (%)=(Discharge capacity of $1^{st}$ cycle/charge capacity of $1^{st}$ cycle)×100    [Equation 1]

Capacity retention ratio (%)=(Discharge capacity of $50^{th}$ cycle/discharge capacity of $1^{st}$ cycle)×100    [Equation 2]

TABLE 1

|  | Initial efficiency (%) | Capacity retention ratio (%) |
| --- | --- | --- |
| Manufacturing | 79 | 82 |
| Manufacturing Example 2 | 78 | 80 |
| Manufacturing | 79 | 84 |
| Manufacturing | 78 | 87 |
| Comparative | 80 | 10 |
| Comparative | 77 | 63 |
| Comparative | 62 | 59 |
| Comparative | 75 | 60 |
| Comparative | 78 | 27 |
| Comparative Manufacturing Example 6 | 68 | 52 |
| Comparative | 78 | 11 |
| Comparative | 77 | 10 |

As shown in Table 1, the coin-half cells prepared in Comparative Manufacturing Examples 1 and 5 had high initial efficiency but relatively low capacity retention ratios. Also, the coin-half cell prepared in Comparative Manufacturing Example 3 did not show satisfactory results in terms of their initial efficiency and capacity retention ratios, and the coin-half cells prepared in Comparative Manufacturing Examples 2 and 4 showed relatively better initial efficiency but unsatisfactory level of capacity retention ratios.

However, the coin-half cells prepared in Manufacturing Examples 1 to 4 had capacity retention ratios that were substantially increased compared to those of the coin-half cells prepared in Comparative Manufacturing Examples 1 to 5, and initial efficiency that is substantially similar to those of the coin-half cells prepared in Comparative Manufacturing Examples 1 and 5.

As a result, the coin-half cells prepared in Manufacturing Examples 1 to 4 had initial efficiency better than or similar to those of the coin-half cells prepared in Comparative Manufacturing Examples 1 to 8, and capacity retention ratios of the coin-half cells prepared in Manufacturing Examples 1 to 4 are improved.

As described above, when an anode active material according to the one or more of the above embodiments is used, a lithium secondary battery with improved lifespan characteristics may be manufactured.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A composite anode active material comprising:
   a silicon-based material;
   a metal fluoride; and
   a carbon-based material
   wherein the silicone-based material, the metal fluoride and the carbon-based material bind directly to one another wherein the metal fluoride is a compound represented by the following formula: MFx, wherein M is at least one selected from magnesium (Mg), aluminum (Al), titanium (Ti), copper (Cu), zinc (Zn), barium (Ba) and bismuth (Bi); and 0<x≤4.

2. The composite anode active material of claim 1, wherein the metal fluoride is at least one selected from aluminum fluoride ($AlF_3$), magnesium fluoride ($MgF_2$), and copper fluoride ($CuF_2$).

3. The composite anode active material of claim 1, wherein the carbon-based material is at least one selected from carbon nanotubes, graphite, graphene, carbon black, and a polymer carbonized product.

4. The composite anode active material of claim 1, wherein an amount of the metal fluoride is in a range of about 1 part to about 70 parts by weight based on 100 parts by weight of the composite anode active material.

5. The composite anode active material of claim 1, wherein an amount of the carbon-based material is in a range of about 1 part to about 50 parts by weight based on 100 parts by weight of the composite anode active material.

6. The composite anode active material of claim 1, wherein the composite anode active material has a structure comprising:
   a core comprising the silicon-based material; and
   a coating layer on at least a part of the core,
   wherein the coating layer comprises the metal fluoride and the carbon-based material.

7. The composite anode active material of claim 6, wherein the coating layer has a single-layer or multi-layer structure.

8. The composite anode active material of claim 1, wherein the composite anode active material has a structure comprising:
   a core comprising the silicon-based material; and
   a coating layer on at least a part of the core, wherein the coating layer comprises:
a first coating layer on the core; and
a second coating layer on the first coating layer,
wherein
the first coating layer comprises one of the metal fluoride and the carbon-based material, and
the second coating layer comprises the other of the metal fluoride and the carbon-based material.

9. The composite anode active material of claim 1, wherein the weight ratio of the mixing weight ratio of the silicone-based material and metal fluoride is 1:1.42 to 1:1.71.

10. The composite anode active material of claim 1, wherein an amount of the metal fluoride is in a range of about 50 part to about 60 parts by weight based on 100 parts by weight of the composite anode active material.

11. An anode comprising a composite anode active material on a current collector,
wherein the composite anode active material comprises:
a silicon-based material;
a metal fluoride; and
a carbon-based material,
wherein the silicone-based material, the metal fluoride and the carbon-based material bind directly to one another wherein the metal fluoride is a compound represented by the following formula: MFx, wherein M is at least one selected from magnesium (Mg), aluminum (Al), titanium (Ti), copper (Cu), zinc (Zn), barium (Ba) and bismuth (Bi); and $0<x\leq4$.

12. The anode of claim 11, wherein the metal fluoride is at least one selected from aluminum fluoride ($AlF_3$), magnesium fluoride ($MgF_2$), and copper fluoride ($CuF_2$).

13. The anode of claim 11, wherein the carbon-based material is at least one selected from carbon nanotubes, graphite, graphene, carbon black and a polymer carbonized product.

14. The anode of claim 11, wherein an amount of the metal fluoride is in a range of about 1 part to about 70 parts by weight based on 100 parts by weight of the composite anode active material.

15. The anode of claim 11, wherein an amount of the carbon-based material is in a range of about 1 part to about 50 parts by weight based on 100 parts by weight of the composite anode active material.

16. The anode of claim 11, wherein the composite anode active material comprises:
a core comprising the silicon-based material; and
a coating layer on at least a part of the core,
wherein the coating layer comprises the metal fluoride and the carbon-based material.

17. The anode of claim 16, wherein the coating layer has a single-layer or multi-layer structure.

18. The anode of claim 11, wherein the composite anode active material has a structure comprising:
a core comprising the silicon-based material; and
a coating layer on at least a part of the core,
wherein the coating layer comprises:
a first coating layer on the core; and
a second coating layer on the first coating layer,
wherein
the first coating layer comprises one of the metal fluoride and the carbon-based material, and
the second coating layer comprises the other of the metal fluoride and the carbon-based material.

19. A lithium secondary battery comprising the anode of claim 11.

* * * * *